United States Patent [19]

Nishimoto et al.

[11] Patent Number: 5,056,556
[45] Date of Patent: Oct. 15, 1991

[54] SOLENOID VALVE

[75] Inventors: Takashi Nishimoto; Tohru Matsuoka, both of Toyama; Fumio Honda, Takaoka; Mineyuki Naruse, Toyama, all of Japan

[73] Assignee: Kabushiki Kaisha Fujikoshi, Toyama, Japan

[21] Appl. No.: 556,425

[22] Filed: Jul. 24, 1990

[51] Int. Cl.⁵ .................. F16K 31/06; F16K 1/42
[52] U.S. Cl. .................. 137/522; 251/129.15; 251/333; 251/359
[58] Field of Search .............. 137/522; 251/129.15, 251/129.21, 333, 359

[56] References Cited

U.S. PATENT DOCUMENTS

| 1,919,232 | 7/1933 | Lee ........................... 251/359 X |
| 2,927,737 | 3/1960 | Zeuch et al. .................. 251/333 X |
| 4,531,708 | 7/1985 | Livet ........................... 251/129.15 X |
| 4,771,984 | 9/1988 | Szablewski et al. ........... 251/129.15 |

FOREIGN PATENT DOCUMENTS

| 56449 | 12/1977 | Japan . |
| 25953 | 6/1986 | Japan . |
| 236976 | 10/1986 | Japan ............... 251/129.15 |

Primary Examiner—Gerald A. Michalsky
Attorney, Agent, or Firm—Spencer & Frank

[57] ABSTRACT

A solenoid valve comprising a valve body, and a poppet vertically slidable within the valve body and moved to and from a valve seat so as to open and close an oil passage. The poppet is in the form of a cylindrical tube and is slidably fit around and supported by a guide rod in an oil-tight manner. The guide rod has a valve seat at its bottom and an oil passage for communication with the interior of the poppet. Features of the present invention are as follows. The guide rod has a surface on which the inner peripheral surface of the poppet is slidable. The outer diameter of such a surface of the guide rod is slightly smaller than that of the valve seat. In this way, the solenoid valve acts as an on-off valve and a relief valve. The valve of the type as thus far explained further includes a passage for reducing the flow velocity of an oil as pressurized between the poppet and the guide rod. A surface of the poppet is shaped to maintain an oil film between the poppet and the valve seat. An armature is integrally formed with the head of the poppet and is shaped in such a manner that the solenoid valve is opened in proportion to input current. The present invention is, thus, applicable to a proportional control valve.

6 Claims, 9 Drawing Sheets

SOLENOID VALVE

BACKGROUND OF THE INVENTION

1. Field of the Invention

The present invention relates to lightweight, compact and high performance solenoid valves suitable for use the transmission of passenger and other vehicles.

2. Description of the Prior Art

Recently, a hydraulically controlled electromagnetic valve has been increasingly used in motor vehicles. Such an electromagnetic valve is essential for various automatic transmissions, and particularly necessary for lock-up control by a four-speed automatic transmission with an autodrive unit and pattern changes by an electronically controlled automatic transmission. For various clutch operations, today's electromagnetic valve acts not only as an on-off valve, but also as a pressure control valve with PMW (pulse width modulation) control. Thus, there is a demand for an electromagnetic valve which is highly reliable and more compact and lightweight than a conventional electromagnetic valve.

Such a conventional solenoid valve typically includes a poppet wherein movable parts are subject to hydraulic pressure. There has recently been proposed a solenoid valve of the type wherein movable parts are in no way subject to hydraulic pressure, for example, as shown in Japanese patent publication No. 61/25953. This type of solenoid valve is designed as a compact and high performance valve. As shown in FIG. 15, this solenoid valve is an electromagnetic valve which includes a body, and a poppet slidably fit within the body and moved to and from a valve seat to open and close a fluid passage. A guide rod is fixed to the body. The hollow poppet is fit around the upper end of the guide rod in an oil-tight manner and slidable therealong. The valve seat is fixed to the bottom of the guide rod. The fluid passage is communicated with the poppet through the interior of the guide rod. The effective diameter of the seal area between the poppet and the valve seat is identical to that of the seal area between the poppet and guide rod. However, this arrangement suffers from the following disadvantages:

First, a coil spring is used to urge or press the poppet. The area where the poppet is seated on the valve seat needs to be large in terms of its structure and also for the purpose of preventing the loss of flow. To this end, it is necessary to provide not only a stronger solenoid, but also a stronger spring for retuning the poppet to its original position when the solenoid is deenergized. A disadvantage with such stronger solenoid and spring is that the threshold value of the working pressure becomes low. Also, in a pressure balance-type valve, the valve can not be opened if the pressure within a circuit reaches an extraordinary value. Therefore, a relief valve must be added to the valve assembly.

Secondly, a disadvantage with such a poppet-type electromagnetic valve is the tendency to generate noise during high-speed operation. When the valve is repeatedly opened and closed at high speed, particularly under flow control by pulse signals, noise is continuously generated thereby causing a serious problem. It is assumed that such noise occurs when two metal parts contact and when hydraulic oil flows at high speed. To this end, there is proposed a poppet, a valve seat or a spacer in the solenoid made of nonmetallic material having an acoustic property. However, such nonmetallic material is not durable and may be used for special purposes, only. To prevent noise due to jet flow of the oil, the solenoid valve may be fully submerged within the oil. However, this may result in an increase in the back pressure and thus resistance to flow of the oil discharged from the valve in which case the valve can not be repeatedly operated at high speeds.

Thirdly, at the beginning of the stroke of an electromagnet, as a drive source for an electromagnetic valve, or when a stator is spaced a long distance from an armature, the magnetic attraction is small. At the end of the stroke of the electromagnet, or when the space between the stator and the armature becomes smaller, magnetic attraction tends to suddenly become greater. In a proportional control valve, it is desirable that the magnetic attraction be in proportion to the input current despite the stroke of the electromagnet. An electromagnet for a proportional control valve used in a hydraulic system may be designed for this effect. One example of a direct current electromagnet is shown in Japanese utility model publication No. 52/56449. As shown in FIG. 16, this direct current electromagnet includes an armature having a converging or tapered end, and a stator having a recess. This recess has a divergent inner surface. The stator has a converging or tapered end, so that the armature can be rapidly attracted to the stator at the beginning. This prevents a sudden increase in the magnetic attraction when a space y between the armature and the stator becomes small.

Such a direct current electromagnet, when used as a compact and high speed proportional control valve for a vehicular transmission, can not provide sufficient magnetic attraction at the beginning of the stroke as shown by broken lines $i_1$, $i_2$ and $i_3$ in FIG. 12. As a result, the magnetic attraction suddenly increases when the space y becomes smaller.

SUMMARY OF THE INVENTION

It is an object of the present invention to overcome the disadvantages encountered in the prior art valve.

A first object of the present invention is achieved as follows. A cylindrical poppet has an inner peripheral surface slidable on a pressure receiving surface of a guide rod and is seated on a pressure receiving surface of a valve seat. The outer diameter $d_1$ of the pressure receiving surface of the guide rod is slightly smaller than the outer diameter $d_2$ of the pressure receiving surface of the valve seat. The outer diameters $d_1$ and $d_2$ are determined by now much the valve can accommodate or allow pressure changes. Such a difference in pressure receiving area creates a force for opening the valve, thereby requiring less output of the solenoid and less force of the spring. When a conventional solenoid is used, the working pressure can be increased. Also, when the working pressure reaches a threshold value, the valve can be automatically opened, and thus acts as a relief valve to protect the overall system.

A second object of the invention is achieved as follows. A passage is provided to reduce the flow velocity of the hydraulic oil within the valve so as to eliminate noise during operation of the valve. An oil film is maintained between the poppet and the valve seat so as to reduce noise created when the poppet is seated on the valve seat. A shock absorbing member is arranged in the valve seat. Such an arrangement reduces noise generated during operation of a poppet-type hydraulic valve and permits the solenoid valve to repeatedly operate at high speeds.

A third object of the invention is achieved as follows. An armature is shaped in such a manner that magnetic flux $\phi_c$ in an axial direction increases at the beginning of its stroke and decreases at the end of its stroke. In this way, magnetic attraction is in proportion to input currents despite displacement of the armature. Accordingly, the solenoid valve can be opened in response to the input currents, and is suitable as a proportional control valve.

BRIEF DESCRIPTION OF THE DRAWINGS

A better understanding of the invention may be had by reference to the following description of preferred embodiments when taken in conjunction with the accompanying drawings, in which.

DESCRIPTION OF THE PREFERRED EMBODIMENTS

Figure 1:
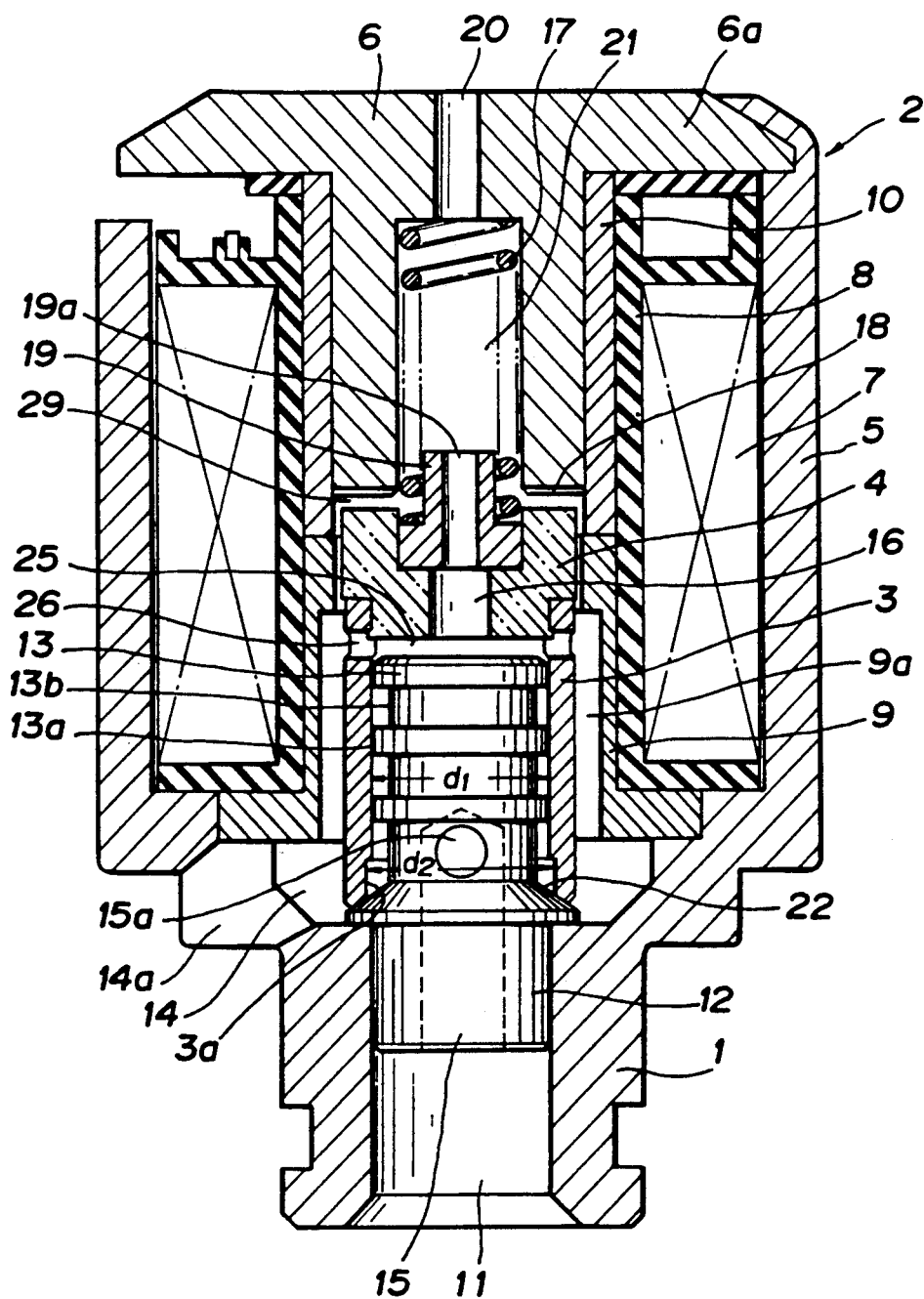
FIG. 1 is a longitudinal sectional view of a solenoid valve according to one embodiment of the present invention.
Figure 2A:
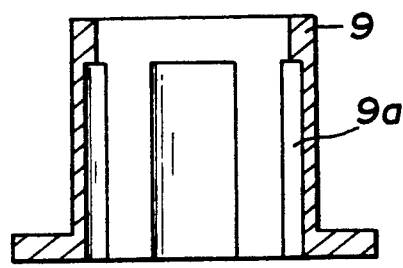
FIG. 2A is a longitudinal sectional view of a sleeve placed in surrounding relation to a poppet.
Figure 2B:
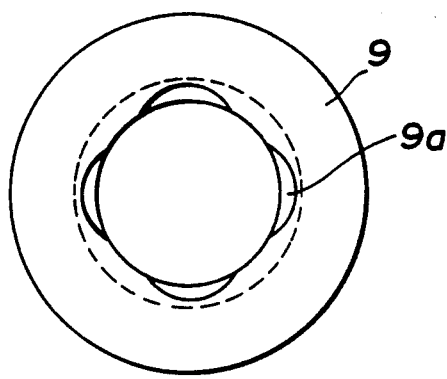
FIG. 2B is a bottom view of the sleeve shown in FIG. 2A.

FIG. 1 shows one embodiment of the present invention. A magnetic body 1 has an inlet port 11. A solenoid 2 is secured to the upper portion of the body 1 in concentric relation to the inlet port 11. The solenoid 2 generally includes a magnetic stator 6 serving as an end cover, a nonmagnetic tube 10, an insulated bobbin 8 on which a solenoid coil is wound, and a magnetic case 5 integral with the body 1. The tube 10 has a lower end contacted with a magnetic sleeve 9 in an oil-tight manner. The sleeve 9 has a plurality of axially extending grooves 9a in its inner peripheral surface as shown in FIGS. 2A and 2B, and is provided at its lower end with a flange joined to the body 1 in an oil-tight manner. The case 5 has an upper end circumferentially recessed to receive the peripheral edge of an end cover portion 6a of the stator 6. The stator 6 has a central through hole 20 for relief of oil.

The lower end of the stator 6 is positioned above the lower end of the tube 10 whereby the lower end of the tube 10 and the sleeve 9 together form a space. A guide member 12 is fit in the inlet port 11 of the body 1 and has a guide rod 13 extending into the space in concentric relation to the inlet port 11. A cylindrical poppet 3 is fit around the guide rod 13 in an oil-tight manner and is slidable therealong. The guide rod 13 has a plurality of lands 13a slidable on the inner peripheral surface of the poppet 3, a plurality of small-diameter portions 13b formed between the lands 13a, and a valve seat 22 formed at its lower end and having an abutment surface in confronting relation to an abutment surface 24 (see FIGS. 5A to 5D) formed at the lower end of the poppet 3. Also, the guide rod 13 has oil passages 15, 15a through which the inlet port 11 and the poppet 3 are communicated with one another. The poppet 3 has an inner diameter d1 which is enlarged at its lower end to provide an enlarged inner diameter portion 3a. The enlarged inner diameter portion 3a has a peripheral edge seated on the abutment surface of the valve seat 22. The diameter of the enlarged inner diameter portion 3a is determined by how much it can accommodate pressure changes. The body 1 has outlet ports 14, 14a which are prevented from communicating with the inlet port 11 when the poppet 3 is seated on the valve seat 22.

A magnetic armature 4 is fixedly mounted to the upper portion of the poppet 3 and has an axially extending through hole 16. The armature 4 has a recess for receiving a silencer 19. The silencer 19 serves as a spring seat on which a spring 17 is seated and has a central through hole 19a. The compression coil spring 17 is disposed between the armature 4 and the stator 6. A nonmagnetic thin spacer 18 is interposed between the stator 6 and the armature 4 so as to permit the poppet 3 to slide down immediately when the solenoid coil 7 is deenergized.

The poppet 3 has openings 26 at its periphery below the armature 4 whereby an oil within a space 25 defined between the lower surface of the armature 4 and the head of the guide rod 13 flows in a lateral direction.

In operation, upon energization of the solenoid 2, the armature 4 is attracted to the stator 6. This causes the poppet 3 to move away from the valve seat 22, and oil under pressure flows from the inlet port 11 to the outlet port 14. At the same time, the oil within the space 29 is pressurized. This pressurized oil then flows in a lateral direction at a high speed and flows out of the solenoid valve through a bore 21, wherein the spring 17 is disposed, and the through hole 20 in the stator 6. When the oil flows in a lateral direction, it contacts the silencer 19 whereby the flow velocity of the oil decreases, and thus, the oil flows in a quiet manner.

When the solenoid 2 is deenergized, then the armature 4 is pressed down under the action of the spring 17. The oil within the space 25 is then pressurized and flows in a lateral direction at a high speed. Although part of this oil flows out of the solenoid valve through the through hole 16 of the stator 6, the through hole 19a of the silencer 19, the bore 21 of the stator 6 and the through hole 20, the majority of the oil flows outwardly and toward the outlet port 14 through the openings 26 of the poppet 3 and the grooves 9a of the sleeve 9. Since flow passage is open in a lateral direction, the flow velocity of the oil decreases, and the oil flows in a quite manner.

Figure 3A:
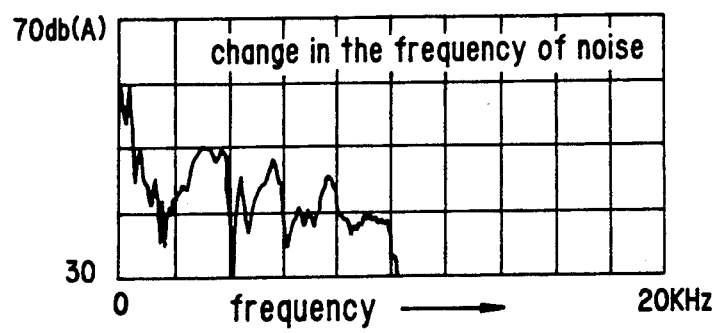
FIG. 3A is a graph showing a change in the frequency of noise generated by the solenoid valve according to the present invention.
Figure 3B:
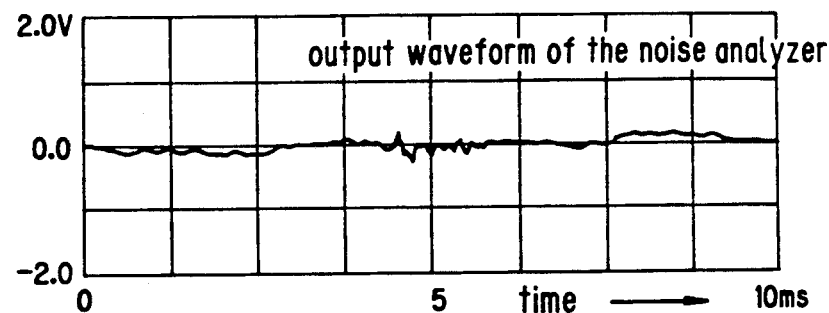
FIG. 3B is a graph showing a waveform of the noise shown in FIG. 3A.
Figure 3C:
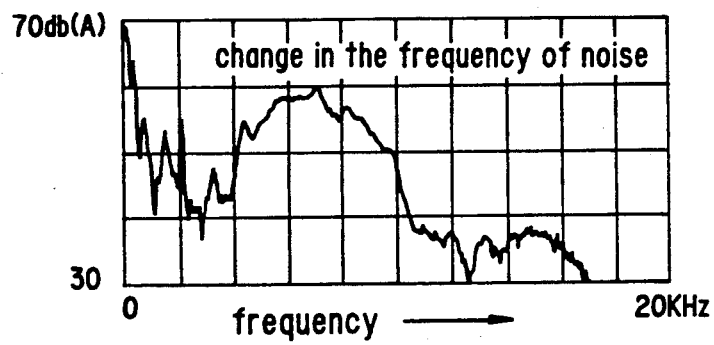
FIG. 3C is a graph showing a change in the frequency of noise generated by a conventional electromagnet valve.
Figure 3D:
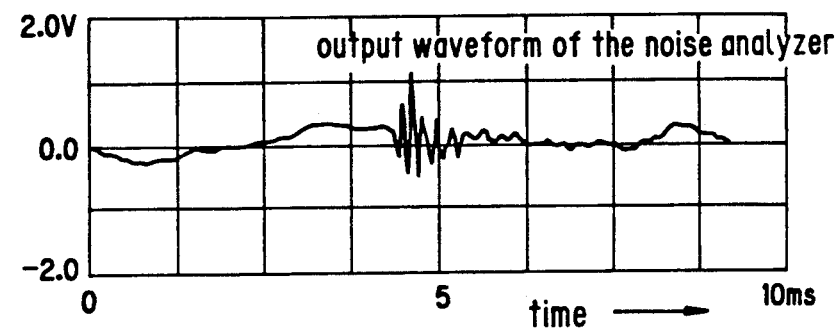
FIG. 3D is a graph showing a waveform of the noise shown in FIG. 3C.

FIGS. 3A and 3B show experimental results of the embodiment thus far described. FIG. 3A is a graph showing a change in the frequency of noise generated during energization of the solenoid of the present invention. FIG. 3B shows a waveform of the noise. FIG. 3C is a graph showing a change in the frequency of noise generated by a conventional electromagnetic poppet valve, and FIG. 3D shows a waveform of the noise. By comparison, it will be appreciated that the solenoid valve of the present invention shows an improvement over a conventional valve.

Figure 4:
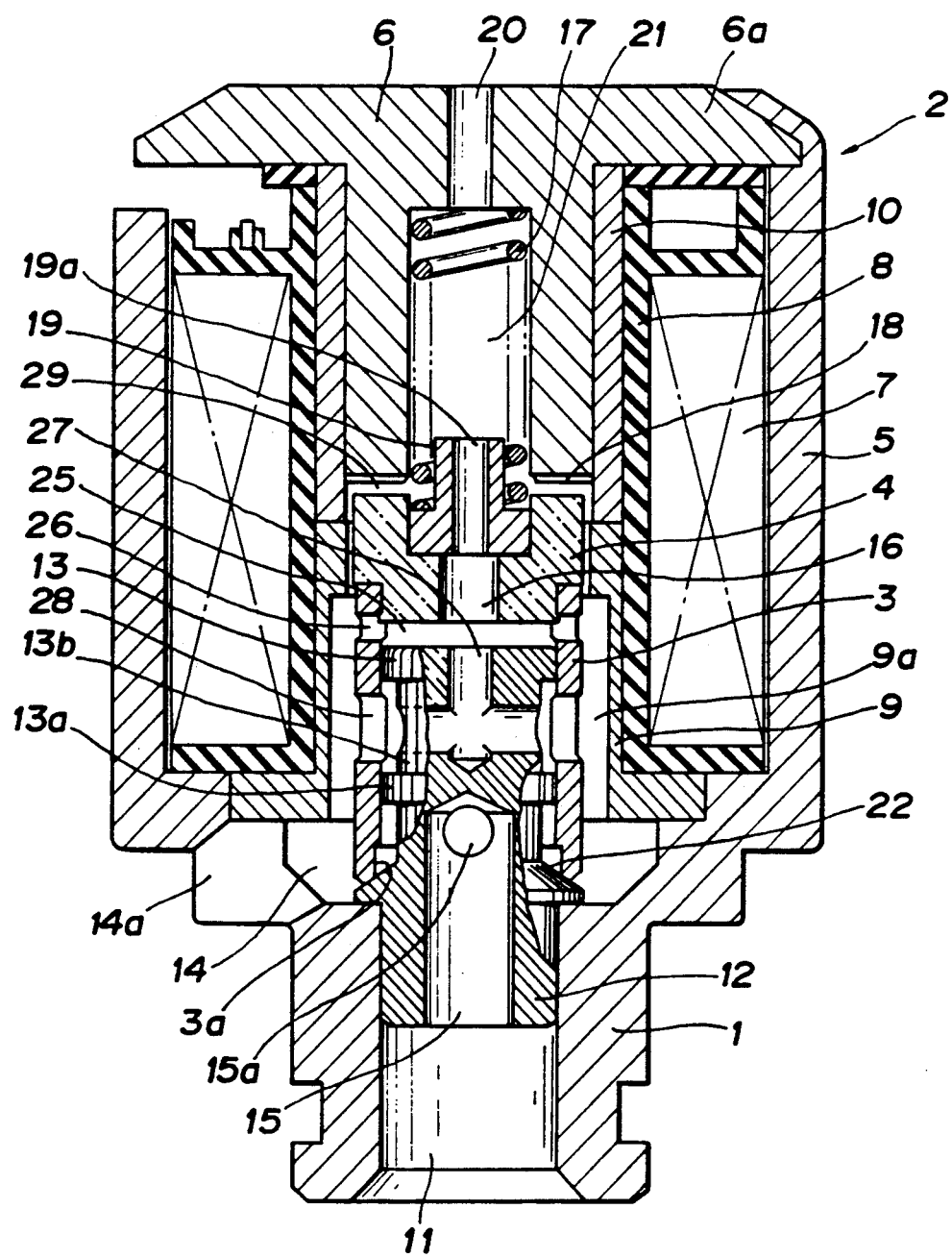
FIG. 4 is a longitudinal sectional view of a solenoid valve according to another embodiment of the present invention.

FIG. 4 shows another embodiment of the present invention. In this embodiment, a passageway 27 extends from the head to near the bottom of the guide rod and is connected to an opening formed at the periphery of the guide rod 13. Correspondingly, the poppet 3 has a through hole 28 so as to permit oil flowing through the opening of the guide rod 13 to flow in a lateral direction.

Upon deenergization of the solenoid 2, the armature 4 is pressed down under the action of the spring 17. This causes oil within the space 25 to partly flow downwardly through the passageway 27 as well as to partly flow toward the outlet port 14 and the like as in the previous embodiment. The oil through the passageway 27 flows in a lateral direction through the through hole 28 and then flows toward the outlet port 14 along the grooves 9a. In this case, the oil flows through various passages. As a result, the flow velocity of the oil further decreases, and the oil flows in a quite manner.

In the illustrated embodiment, more passages are communicated with the outlet port 14. Thus, the through hole 19a of the silencer 19 may be avoided. In such a case, the oil between the lower surface of the armature 4 and the head of the guide rod 13 flows toward the outlet port 14 through the through holes 26 and 28.

Also, the stator 14 may not need the through hole 20. In such a case, upon energization of the solenoid 2, oil within the space 29 first enters into the spring chamber or bore 21 of the stator 6, flows through the through hole 19a of the silencer 19 and the through hole 16 of the armature 4, and flows toward the outlet port 14 through the through holes 26 and 28.

When the silencer 19 does not include the through hole 19a or the stator 6 does not include the through hole 20, noise generated by the oil is confined within the solenoid valve, thereby effectively reducing the noise.

With reference to FIGS. 5A through 5D and FIG. 7, the poppet and the valve seat are designed to reduce sound or noise arising from their contact.

Figure 5A:
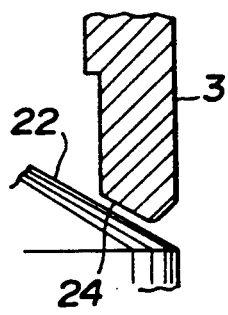
FIGS. 5A through 5D show fragmentary sectional view of tapered poppet and valve seat in various forms.
Figure 5B:
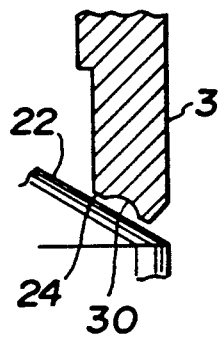
Figure 5C:
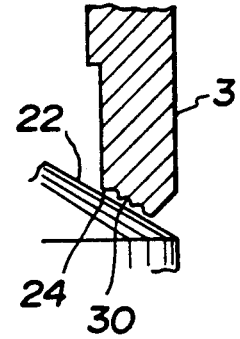
Figure 5D:
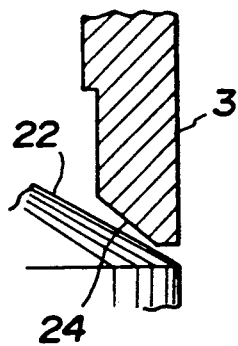
Figure 6A:
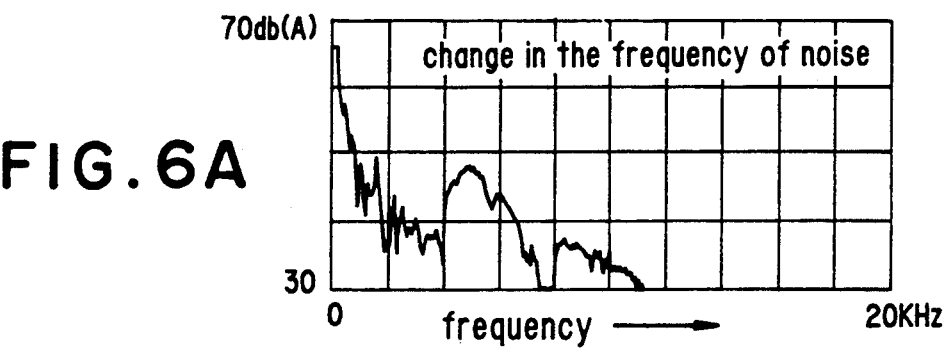
FIG. 6A is a graph showing a change in frequency of noise generated when the poppet is seated on the valve seat.
Figure 6B:
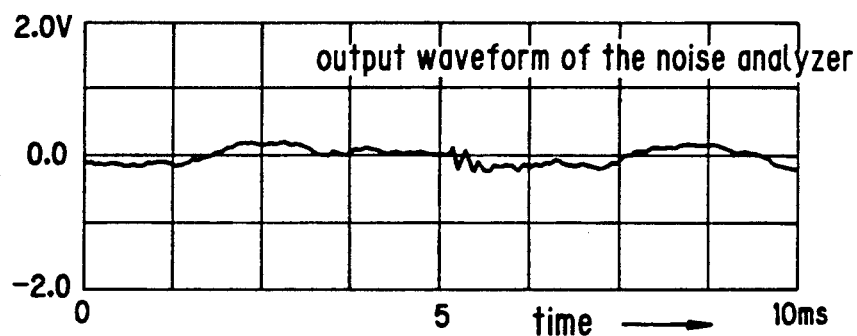
FIG. 6B shows a waveform of the noise in FIG. 6A.
Figure 6C:
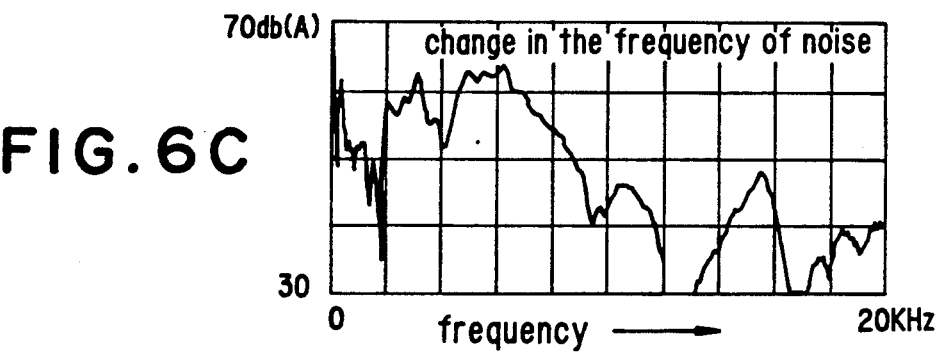
FIG. 6C is a graph showing a change in frequency of noise generated when a poppet is seated on a valve seat in a conventional electromagnetic poppet valve.
Figure 6D:
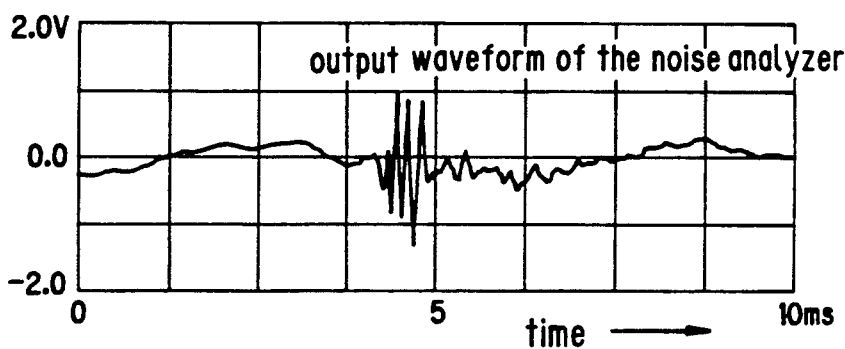
FIG. 6D shows a waveform of the noise in FIG. 6C.

FIGS. 5A through 5D show the cylindrical poppet 3 just before being seated on the conical valve seat 22. In FIG. 5A, the abutment surface 24 of the poppet 3 is a tapered surface and has a vertical angle identical to that of the valve seat 22. With this arrangement, an oil film can be maintained until the poppet 3 is almost seated on the valve seat 22. The abutment surface 24 may have a single annular groove 30 as shown in FIG. 5B or a plurality of annular grooves 30 as shown in FIG. 5C. The provision of the grooves 30 better maintains an oil film. In FIG. 5D, the abutment surface 24 of the poppet 3 is tapered or in the form of a cone, but has a vertical angle slightly smaller than that of the tapered surface of the valve seat 22. This arrangement better maintains an oil film and fascilitates contact of the poppet with the valve seat. FIGS. 6A to 6D show experimental results of the poppet/valve seat arrangement shown in FIG. 5D. FIG. 6A is a graph showing the change in the frequency of noise generated when the poppet 3 is seated on the seat valve 22. FIG. 6B shows a waveform of the noise in FIG. 6A. FIG. 6C is a graph showing the change in the frequency of noise generated when a poppet is seated on a valve seat in a conventional electromagnetic valve. FIG. 6D shows a waveform of the noise in FIG. 6C. As is clear from these figures, the arrangement of the present invention provides an improvement over a conventional valve arrangement.

Figure 7:
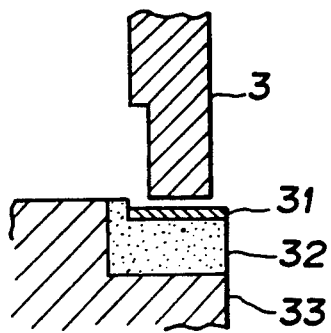
FIG. 7 is a fragmentary sectional view of a poppet/valve seat arrangement wherein the poppet and the valve seat both have plane surfaces, and the valve seat has a shock absorbing layer.

With reference to FIG. 7, the abutment surface 24 of the poppet 3 is a plane surface. In FIG. 7, the abutment surface is shown as being almost seated on a plane valve seat in the form of a ring. In the illustrated embodiment, the abutment surface of the valve seat is in the form of a metal plate 31. A shock absorbing layer 32 is made of a metal, such as lead, having acoustical and vibration-proof characteristics and is sandwiched between the valve seat plate 31 and a valve seat base 33 to provide a valve seat.

When the poppet is seated on the valve seat, the shock absorbing layer serves to reduce noise arising from contact of the metal poppet and the metal valve seat.

Figure 8:
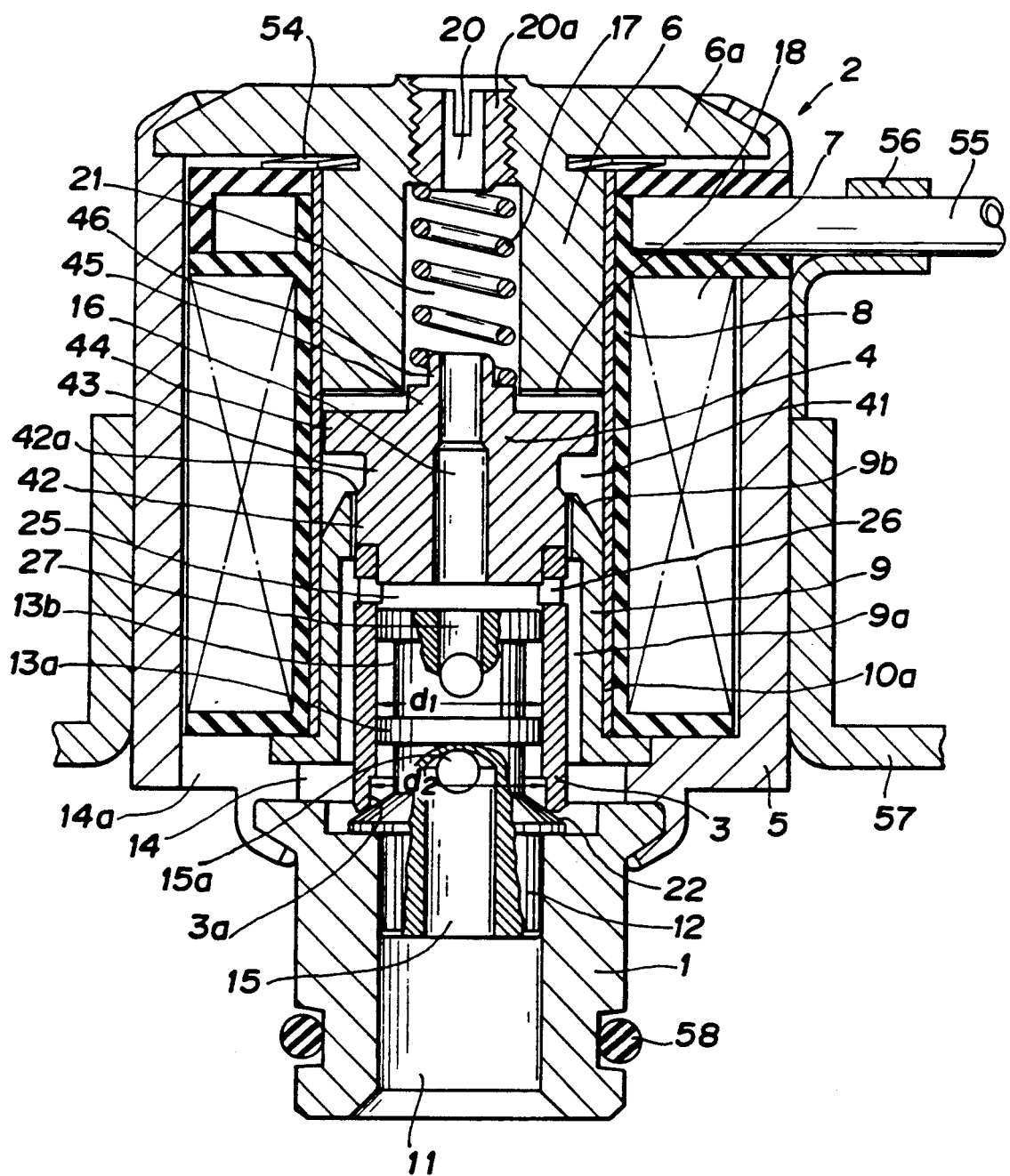
FIG. 8 is a longitudinal sectional view of the solenoid valve used as a proportional pressure control valve.

Referring now FIG. 8, the present invention is applied to a proportional pressure control valve. This embodiment is substantially similar in structure to those shown in FIGS. 1 through 4, and therefore, only different parts of the valve will be described. The entire length of a nonmagnetic tube 10a is fit in the bobbin 8 in an oil-tight manner. The sleeve 9, made of a magnetic material, is fit in the tube 10a and has a tapered upper end 9b. An axial space is defined between the tapered end 9b of the sleeve 9 and the stator 6. The sleeve 9 has a lower end fixed to the case 5. The sleeve 9, the case 5, the cover plate 6a and the stator 6 together form a magnetic passage.

The electromagnet has a central hollow portion within which the armature 4 is vertically slidably movable. The armature 4 has the through hole 16 at its center and has a lower end 42 loosely fit in the sleeve 9. The armature 4 also has a tapered portion 42a which is located above the upper portion of the sleeve 9 when the armature 4 is moved downwardly, and a small-diameter portion 43 at its mid-portion. An upper portion 44 of the armature 4 is located within the space 41 between the upper end of the sleeve 9 and the lower end of the stator 6 and flanged to terminate near the inner periphery of the tube 10a. The upper end of the armature is a plane surface which can be in contact with the lower end of the stator 6. The flanged upper portion of the armature 4 has a central projection 45 loosely fit in the bore 21 of the stator 4 where the spring 17 is received. The spring 17 is disposed between the projection 45 and an adjusting screw 20a. The adjusting screw 20a is threaded in the upper portion of the stator 6 and has a through hole 20. A spring seat 46 extends upwardly from the projection 45.

A leaf spring 54 is disposed to press the bobbin 8 in an effort to accommodate thermal expansion. An electric wire 55 through which elecric current is supplied to a direct current coil 7 is supported by a support 56. Such an electromagnetic valve assembly may be mounted, through an O-ring 58 fit in a groove of the body 1, to a vehicular transmission casing (not shown) by a mount 57.

In operation of the embodiment in FIG. 8, the coil 7 is not provided with a current. The poppet 3, together with the armature 4, is thus pressed down under the action of the spring 17 and seated on the valve seat 22. This prevents communication between the inlet port 11 and the outlet ports 14 and 14a.

When a current flows through the coil 7, the armature 4 is then attracted to the stator 6, and at the same time, the poppet 3 is moved away from the valve seat 22. This causes the hydraulic oil to flow from the inlet port 11 to the small-diameter portion 13a via the passages 15 and 15a. The oil pressure decreases when the oil passes between the poppet 3 and the valve seat 22. The oil finally enters into the outlet ports 14 and 14a.

Magnetic flux, as created by the coil 7, moves in the following order: the case 5; the sleeve 9; the armature 4; a space y (FIG. 9) between the upper end of the armature 4 and the lower end of the stator 6; the cover plate 6a; and the case 5 again. Such magnetic flux and magnetic attraction are illustrated in FIG. 9.

Figure 9:
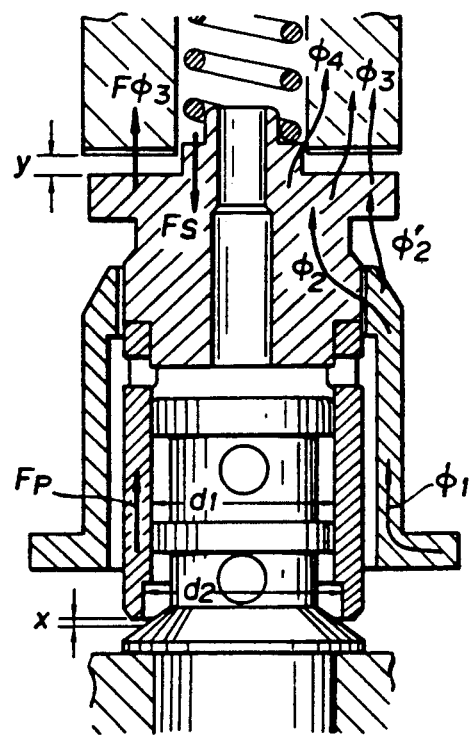
FIG. 9 illustrates magnetic flux passing through the solenoid valve shown in FIG. 8.
Figure 10:
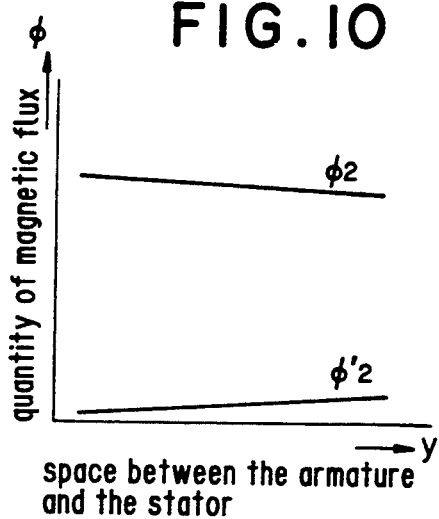
FIGS. 10 and 11 are graphs showing the total quantity of magnetic flux vs. space between the armature and the stator.

In FIG. 9, $\phi_1$ represents magnetic flux in the sleeve 9. $\phi_2$ represents magnetic flux passing from the sleeve to the upper portion 44 of the armature 4 through its lower portion 42 and mid-portion 43. $\phi'_2$ represents magnetic flux passing directly from the upper end of the sleeve 9 to the upper portion 44 of the armature 4. FIG. 10 shows the total quantity of the magnetic flux $\phi_2$ and $\phi'_2$ in relation to the space between the armature and the stator. $\phi'_2$ provides a force by which the armature 4 is moved downwardly. To this end, the sleeve 9 has a tapered or converging upper end 9b so as to minimize the total quantity of magnetic flux $\phi'_2$.

$\phi_3$ represents magnetic flux moving axially from the armature 4 to the stator 6. $\phi_4$ represents magnetic flux moving radially from the projection 45 of the armature 4 toward the inner peripheral surface of the stator 6. $\phi_3$ provides a force by which the armature 4 is moved upwardly. This is not the case of $\phi_4$. Therefore, the greater the magnetic flux $\phi_3$, the greater the magnetic attraction.

If magnetic leakage can be neglected, the magnetic fluxes are represented by the following equation.

$$\phi_1 = \phi_2 + \phi'_2 = \phi_3 + \phi_4 \tag{1}$$

Figure 11:
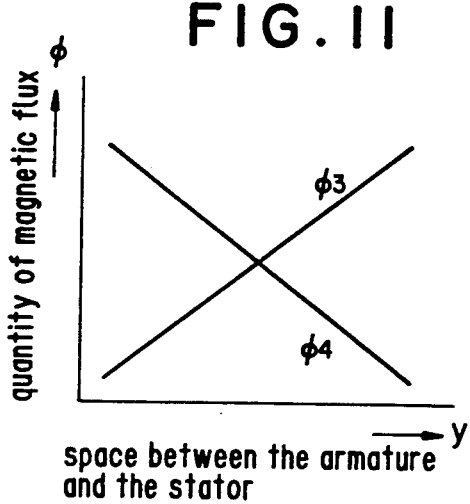

FIG. 11 shows the total quantity of the magnetic flux $\phi_3$ and $\phi_4$ vs. the space y between the armature and the stator. As the space becomes narrower, the projection 45 of the armature 4 is more deeply fit in the central bore 21. A sudden increase in the magnetic attraction can be prevented if the total quantity or ratio of the magnetic flux $\phi_4$ increases.

Again referring FIG. 9, Fs represents a downward force exerted by the spring 17. F$\phi_3$ represents the magnetic attraction by the magnetic flux $\phi_3$ for moving the armature 4 upwards. Fp represents an upward force by oil pressure $P_1$. $d_1$ represents the inner diameter of the guide portion of the poppet 3. $d_2$ represents the inner diameter of a portion of the poppet 3 to be seated on the valve seat 22. When the valve is opened to an extent as indicated by x, $$Fs = F\phi_3 + Fp \tag{2}$$

Figure 12:
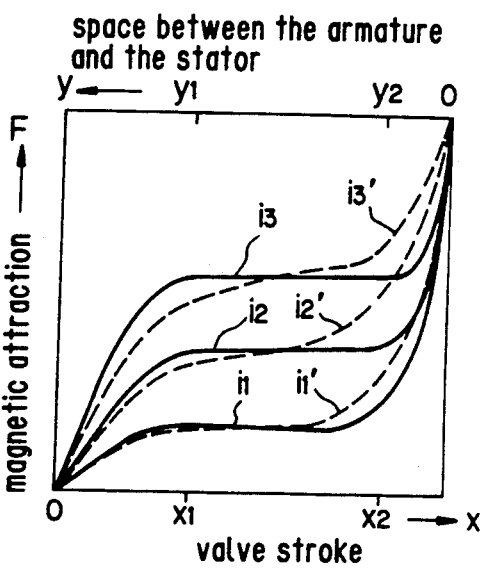
FIG. 12 is a graph showing magnetic attraction vs. valve stroke.

F$\phi_3$ is a function of the space y between the armature 4 and the stator 6 in relation to an input current i. As shown by the solid lines in FIG. 12, the range of valve stroke x where magnetic attraction F$\phi_3$ is kept constant is proportional to input currents $i_1$, $i_2$ and $i_3$. This relationship is effectively utilized in the proportional control valve.

$$\text{Also, } Fp = \frac{\pi}{4}(d_2^2 - d_1^2) \cdot P_1 \tag{3}$$

From the equation (2), $$\frac{\pi}{4}(d_2^2 - d_1^2) \cdot P_1 = Fs - F\phi_3$$

Therefore, $$P_1 = (Fs - F\phi_3)/\frac{\pi}{4}(d_2^2 - d_1^2) \tag{4}$$

Figure 13:
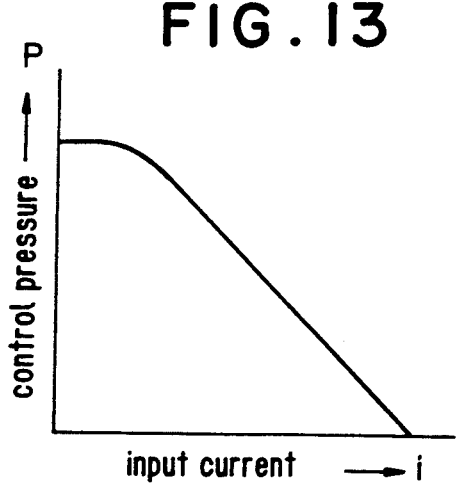
FIG. 13 is a graph showing input current vs. control pressure.

$P_1$ is a pressure controlled by the control valve. As shown in FIG. 13, such a pressure is proportional to the input current.

$P_1$ is also a load pressure. Therefore, when $P_1$ is equal to the sum of $P_1$ and $\Delta P_1$, from the equation (3), the upward force increases by $\Delta Fp$ $$\Delta Fp = \frac{\pi}{4}(d_2^2 - d_1^2) \cdot \Delta P_1$$

As a result, the valve is opened further to $(x + \Delta x)$. This facilitates flow of the hydraulic oil, and the pressure value is returned to the original pressure $P_1$ with a decrease of $\Delta P_1$.

Figure 14:
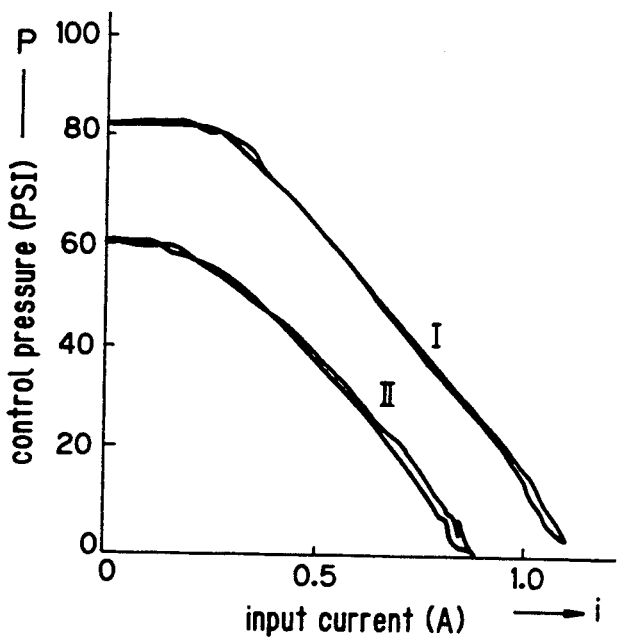
FIG. 14 is a graph showing experimental results of the embodiment shown in FIG. 8 as to input current vs. control pressure.
Figure 15:
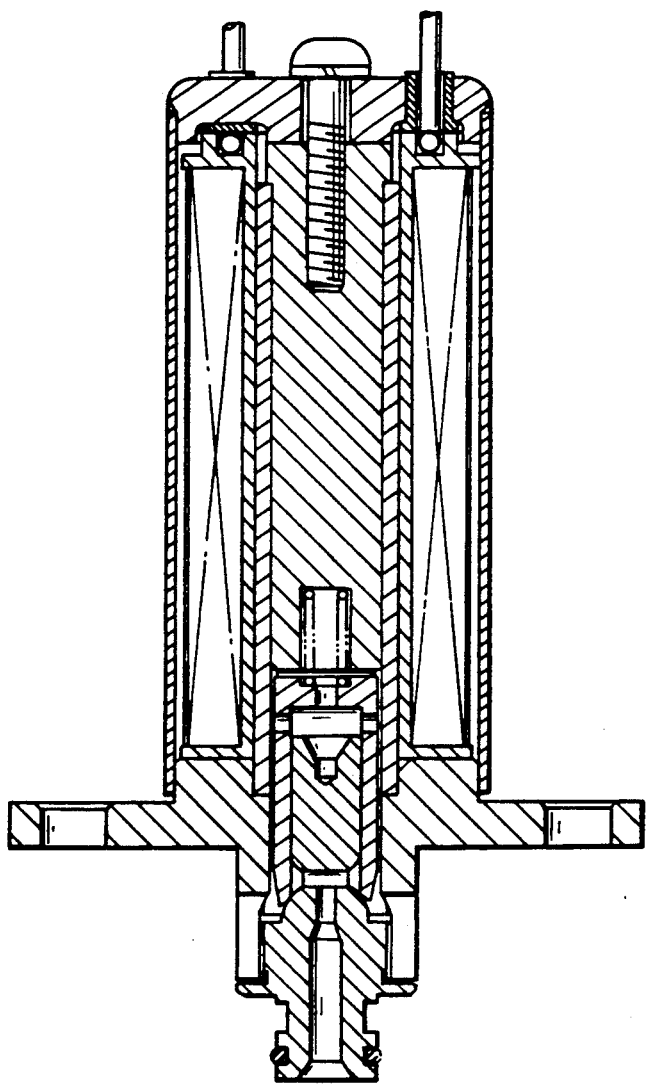
FIG. 15 is a longitudinal sectional view of a conventional solenoid valve.
Figure 16:
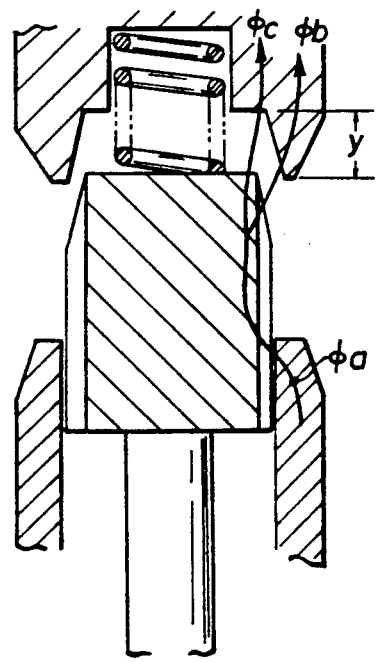
FIG. 16 is a fragmentary sectional view of a conventional direct current electromagnet.

FIG. 14 is a graph showing experimental results of the present embodiment. In both cases, I and II, control pressure varies substantially inversely as input current since hysteresis does not occur during operation of the valve.

Although the preferred embodiments of the invention have been described, it will be understood to one skilled in the art that the invention is not limited thereto, and various modifications may be made therein without departing from the spirit of the invention and the scope of the appended claims.

What is claimed is:

1. In a solenoid valve including a body, a poppet slidably movable within said body, and a valve seat arranged within said body and having a seat surface, said poppet being moved to and from the seat surface of said valve seat by an electromagnetic force and a spring to open and close a port in said body, the improvement comprising a seat guide extending from said seat surface of the valve seat, said poppet being fit around said seat guide and slidably movable along said seat guide, said seat guide having a diameter slightly smaller than an effective diameter of a pressure receiving portion of said seat surface and acting as an on-off valve and a relief valve.

2. A solenoid valve according to claim 1, wherein said seat surface of the valve seat is a tapered surface, and said poppet has a corresponding tapered edge.

3. In an electromagnetic poppet valve comprising a body, a poppet slidably movable within said body, and a cylindrical poppet having an abutment surface at one end and an armature at the other end, and a valve seat arranged within said body, said poppet being moved to and from said valve seat by an electromagnetic force and a spring so as to open and close an oil passage in said body, said body including a fixed guide rod around which said poppet is slidable fit in an oil-tight manner, said valve seat being connected to the bottom of said guide rod, said oil passage being communicated with the interior of said poppet through the interior of said guide rod, the improvement wherein said guide rod has a passage extending from its upper end to near its lower end and an opening communicated with said passage, said poppet has a corresponding through hole through which oil coming through said opening of the guide rod flows in a lateral direction, said armature has an axially extending through hole, wherein a silencer is attached to the rear of said armature, and wherein said poppet has a through hole through which oil present between the inner end of said armature and the upper end of said guide rod flows in a lateral direction.

4. In an electromagnetic poppet valve including a body, a poppet slidably movable within said body and an annular abutment surface, and a valve seat arranged within said body and having a plane abutment surface, said poppet being moved to and from said valve seat by an electromagnetic force and a spring so as to open and close an oil passage, the improvement wherein said valve seat has a metal plate on which said poppet is seated, and an intermediate member of a shock absorbing property is interposed therebetween.

5. An electromagnetic proportional control valve including a cylindrical coil surrounded by a magnetic frame, a stator fit in the upper portion of said coil, a sleeve fit in the lower end of said coil, and an armature vertically movable within said sleeve, said sleeve including an upper end spaced axially from the lower end of said stator and having a tapered surface, said armature having a lower portion loosely fit in said sleeve and extending substantially up to the upper end of said sleeve, a mid-portion including a tapered surface connected to said lower portion and having a reduced diameter, an upper portion including a flange radially extending and terminating at near the inner periphery of said coil and having a plane upper surface adapted to contact the lower end of said stator, and a projection extending upwardly from the center of said flange and loosely fit in a central hole of said stator.

6. An electromagnetic proportional control valve according to claim 5, further including a poppet fixed to said armature, a guide rod extending from a body, said poppet being fit in the upper end of said guide rod in an oil-tight manner, a valve seat fixed to the lower end of said guide rod, said poppet being movable to and from said valve seat, and an oil passage communicated with said poppet through the interior of said guide rod, said poppet having at its lower end an abutment portion adapted to contact said valve seat, said abutment portion having an inner diameter greater than that of a slidable portion of said poppet.

* * * * *